(12) United States Patent
Tu et al.

(10) Patent No.: US 10,748,036 B2
(45) Date of Patent: Aug. 18, 2020

(54) TRAINING A NEURAL NETWORK TO PREDICT SUPERPIXELS USING SEGMENTATION-AWARE AFFINITY LOSS

(71) Applicant: NVIDIA Corporation, Santa Clara, CA (US)

(72) Inventors: Wei-Chih Tu, New Taipei (TW); Ming-Yu Liu, Sunnyvale, CA (US); Varun Jampani, Nashua, NH (US); Deqing Sun, Providence, RI (US); Ming-Hsuan Yang, Sunnyvale, CA (US); Jan Kautz, Lexington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 116 days.

(21) Appl. No.: 16/188,641

(22) Filed: Nov. 13, 2018

(65) Prior Publication Data

US 2019/0156154 A1    May 23, 2019

Related U.S. Application Data

(60) Provisional application No. 62/589,372, filed on Nov. 21, 2017.

(51) Int. Cl.
*G06K 9/00* (2006.01)
*G06T 7/00* (2017.01)
(Continued)

(52) U.S. Cl.
CPC ............ *G06K 9/6262* (2013.01); *G06N 3/04* (2013.01); *G06N 3/08* (2013.01); *G06T 7/11* (2017.01);
(Continued)

(58) Field of Classification Search
CPC ..... G06K 9/6262; G06T 7/11; G06T 2200/28; G06T 2207/10024; G06T 2207/20081;
(Continued)

(56) References Cited

U.S. PATENT DOCUMENTS 9,978,003 B2    5/2018    Sachs et al.
10,089,742 B1   10/2018   Lin et al.
(Continued)

FOREIGN PATENT DOCUMENTS

CN    103839079 A    6/2014
CN    107122809 A    9/2017
(Continued)

OTHER PUBLICATIONS

Ahn et al., "Learning Pixel-level Semantic Affinity with Image-level Supervision forWeakly Supervised Semantic Segmentation," preprint from arXiv, 2018, pp. 1-14, retrieved from https://arxiv.org/pdf/1803.10464.pdf.
(Continued)

*Primary Examiner* — Ping Y Hsieh
(74) *Attorney, Agent, or Firm* — Leydig, Voit & Mayer, Ltd.

(57) ABSTRACT

Segmentation is the identification of separate objects within an image. An example is identification of a pedestrian passing in front of a car, where the pedestrian is a first object and the car is a second object. Superpixel segmentation is the identification of regions of pixels within an object that have similar properties An example is identification of pixel regions having a similar color, such as different articles of clothing worn by the pedestrian and different components of the car. A pixel affinity neural network (PAN) model is trained to generate pixel affinity maps for superpixel segmentation. The pixel affinity map defines the similarity of two points in space. In an embodiment, the pixel affinity map
(Continued)

indicates a horizontal affinity and vertical affinity for each pixel in the image. The pixel affinity map is processed to identify the superpixels.

20 Claims, 13 Drawing Sheets

(51) Int. Cl.
| | |
|---|---|
| G06K 9/62 | (2006.01) |
| G06N 3/04 | (2006.01) |
| G06N 3/08 | (2006.01) |
| G06T 7/11 | (2017.01) |

(52) U.S. Cl.
CPC .................... *G06T 2200/28* (2013.01); *G06T 2207/10024* (2013.01); *G06T 2207/20081* (2013.01); *G06T 2207/20084* (2013.01)

(58) Field of Classification Search
CPC ... G06T 2207/20084; G06N 3/04; G06N 3/08
See application file for complete search history.

(56) References Cited

U.S. PATENT DOCUMENTS

| | | | | |
|---|---|---|---|---|
| 2016/0335524 | A1* | 11/2016 | Bremer | G06T 7/0012 |
| 2017/0132769 | A1* | 5/2017 | Barron | G06K 9/6215 |
| 2017/0236287 | A1* | 8/2017 | Shen | G06N 3/0454 |
| | | | | 382/206 |
| 2018/0012365 | A1 | 1/2018 | Chefd'hotel et al. | |
| 2018/0122072 | A1 | 5/2018 | Abedini et al. | |
| 2018/0253622 | A1 | 9/2018 | Chen et al. | |
| 2019/0147588 | A1* | 5/2019 | Rowley Grant | G16H 30/40 |
| | | | | 382/131 |
| 2019/0164290 | A1* | 5/2019 | Wang | G06K 9/4628 |
| 2019/0295260 | A1* | 9/2019 | Mehta | G06K 9/4628 |

FOREIGN PATENT DOCUMENTS

| | | |
|---|---|---|
| CN | 107316289 A | 11/2017 |
| CN | 108280132 A | 7/2018 |

OTHER PUBLICATIONS

Turaga et al., "Convolutional Networks Can Learn to Generate Affinity Graphs for Image Segmentation," Neural Computation, vol. 22, 2010, pp. 511-538.

He et al., "SuperCNN: A Superpixelwise Convolutional Neural Network for Salient Object Detection," International Journal of Computer Vision, Apr. 8, 2015, 15 pages.

Liu et al., "CRF Learning with CNN Features for Image Segmentation," School of Computer Science, The University of Adelaide, Australia, Mar. 31, 2015, 11 pages, retrieved from https://arxiv.org/abs/1503.08263.

Ke et al., "Adaptive Affinity Fields for Semantic Segmentation," UC Berkeley / ICSI, 2018, retrieved from https://arxiv.org/pdf/1803.10335.pdf.

Tu et al., "Learning Superpixels with Segmentation-Aware Affinity Loss," CVPR, 2018, 9 pages.

Xie et al., "Holistically-Nested Edge Detection," IEEE International Conference on Computer Vision, 2015, pp. 1395-1403.

Liu et al., "Entropy Rate Superpixel Segmentation," IEEE International Conference on Computer Vision, 2011, pp. 2097-2104.

* cited by examiner

Input Data

Ground-truth Segments

Superpixels

TRAINING A NEURAL NETWORK TO PREDICT SUPERPIXELS USING SEGMENTATION-AWARE AFFINITY LOSS

CLAIM OF PRIORITY

This application claims the benefit of U.S. Provisional Application No. 62/589,372 titled "LEARNING SUPERPIXELS WITH SEGMENTATION-AWARE AFFINITY LOSS," filed Nov. 21, 2017, the entire contents of which are incorporated herein by reference.

FIELD OF THE INVENTION

The present invention relates to segmentation of image data, and more particularly to superpixel segmentation.

BACKGROUND

Segmentation is the identification of separate objects within an image. An example is identification of a pedestrian passing in front of a car, where the pedestrian is a first object and the car is a second object. Superpixel segmentation is the identification of regions of pixels within an object that have similar properties. An example is identification of pixel regions having a similar color, such as different articles of clothing worn by the pedestrian and different components of the car (bumper, windshield, door, headlight, etc.). Importantly, a pixel region should not cross an object boundary. Conventional superpixel segmentation techniques often fail to preserve weak object boundaries. There is a need for addressing these issues and/or other issues associated with the prior art.

SUMMARY

A pixel affinity neural network (PAN) model is trained to generate pixel affinity maps for superpixel segmentation. The pixel affinity map defines the similarity of two points in space. In an embodiment, the pixel affinity map indicates a horizontal affinity and vertical affinity for each pixel in the image. The pixel affinity map is processed to identify the superpixels. A segmentation-aware loss function is used to train the PAN model.

A method, computer readable medium, and system are disclosed for predicting superpixels in an image. Input data corresponding to pixels in the image is received. Ground-truth object segmentation data corresponding to the input data is received, where the ground-truth object segmentation data identifies objects in the image and the pixels within each object. A loss module processes the ground-truth object segmentation data and a superpixel map to compute correction data. The superpixel map corresponds to the input data and indicates regions of the pixels within each object. A pixel affinity neural network model processes the input data using parameters to produce predicted pixel affinity values corresponding to the image, where the parameters are updated based on the correction data.

DETAILED DESCRIPTION

Superpixels group pixels within an object that have similar properties and provide a more natural representation of image data compared with individual pixels. In addition, superpixels reduce the number of primitives to operate on, thereby improving the computational efficiency of vision algorithms. The process of extracting superpixels is known as superpixel segmentation or over-segmentation. Superpixels are used for a wide range of computer vision applications such as salient object detection and semantic segmentation. In light of the fundamental importance of superpixels in computer vision, numerous superpixel segmentation algorithms have been proposed. Despite differences in problem formulation (graph-based or clustering-based), existing algorithms mainly rely on hand-crafted features, and thus often fail to separate pixel regions within an object from the background (or other objects) if no strong boundaries can be identified.

Figure 1A:
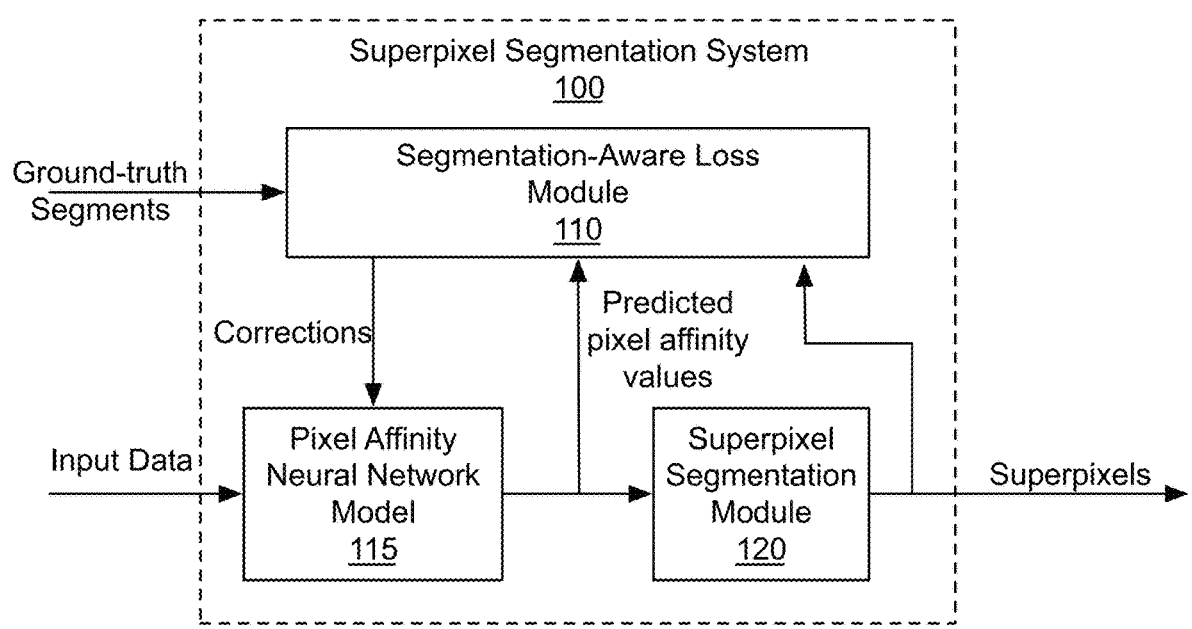
FIG. 1A illustrates a block diagram of a superpixel segmentation system, in accordance with an embodiment.
Figure 3:
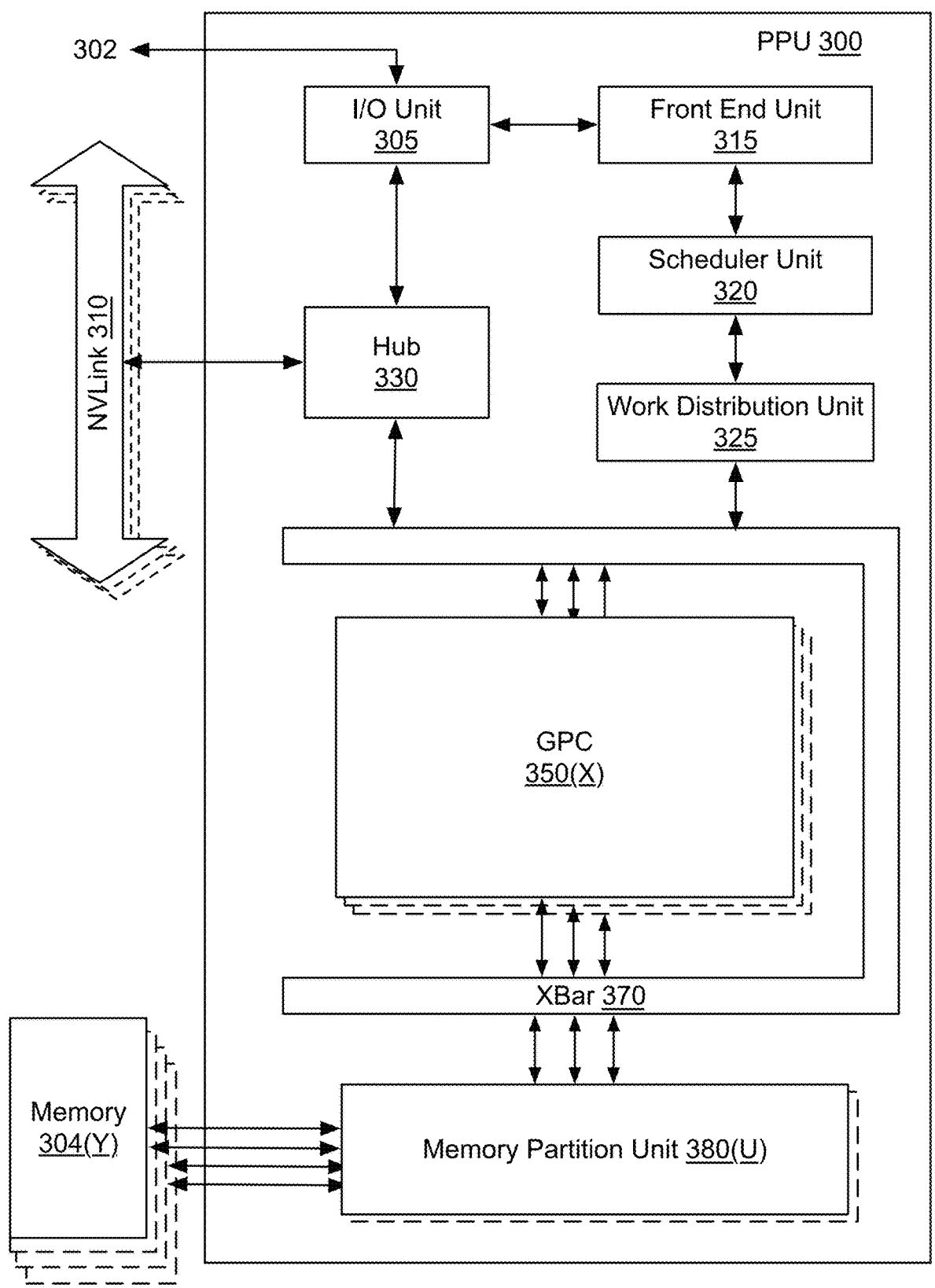
FIG. 3 illustrates a parallel processing unit, in accordance with an embodiment.

FIG. 1A illustrates a block diagram of a superpixel segmentation system 100, in accordance with an embodiment. The superpixel segmentation system 100 includes a segmentation-aware loss (SEAL) module 110, a pixel affinity neural network (PAN) model 115, and a superpixel segmentation module 120. Although the superpixel segmentation system 100 is described in the context of processing units, one or more of the SEAL module 110, the PAN model 115, and the superpixel segmentation module 120 may be performed by a program, custom circuitry, or by a combination of custom circuitry and a program. For example, the PAN model 115 may be implemented by a GPU (graphics processing unit), CPU (central processing unit), or any processor capable of implementing layers of a neural network. In an embodiment, parallel processing unit (PPU) 300 of FIG. 3 is configured to implement the superpixel segmentation system 100. Furthermore, persons of ordinary skill in the art will understand that any system that performs the operations of the superpixel segmentation system 100 is within the scope and spirit of embodiments of the present invention.

The PAN model 115 receives input data and corrections generated by the SEAL module 110 and generates predicted pixel affinity values. In an embodiment, the predicted pixel affinity values are represented as a pixel affinity map that defines the similarity of two points in space. In an embodiment, the pixel affinity map indicates a horizontal affinity and vertical affinity for each pixel in the input data. The pixel affinity map is processed by the superpixel segmentation module 120 to identify superpixels. In an embodiment, the superpixels are represented as a superpixel map.

The PAN model 115 is trained based on ground-truth segmentation data (segments) and the superpixels for the input data, to generate the predicted pixel affinity values. The SEAL module 110 receives the superpixels, ground-truth segmentation data, and the predicted pixel affinity values and computes corrections. In an embodiment, ground-truth pixel affinity values are generated from the ground-truth segmentation data. In an embodiment, the SEAL module 110 compares the ground-truth pixel affinity values with the predicted pixel affinity values to produce the corrections. In an embodiment a weighted binary cross-entropy (BCE) loss function is used to compute the corrections. During training, parameters (weights) of the PAN model 115 are updated using the corrections. The corrections train the PAN model 115 to predict segmentation-aware pixel affinity maps for superpixel segmentation.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
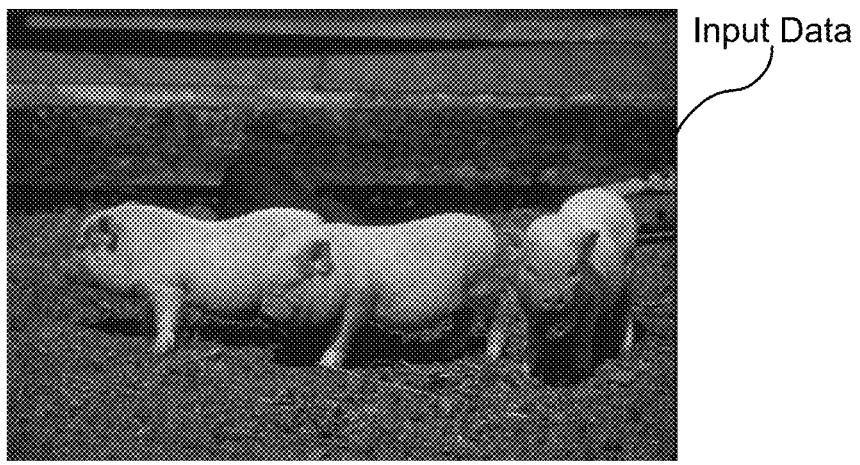
FIG. 1B illustrates input data, ground-truth segments, and superpixels, in accordance with an embodiment.
Figure 1B:
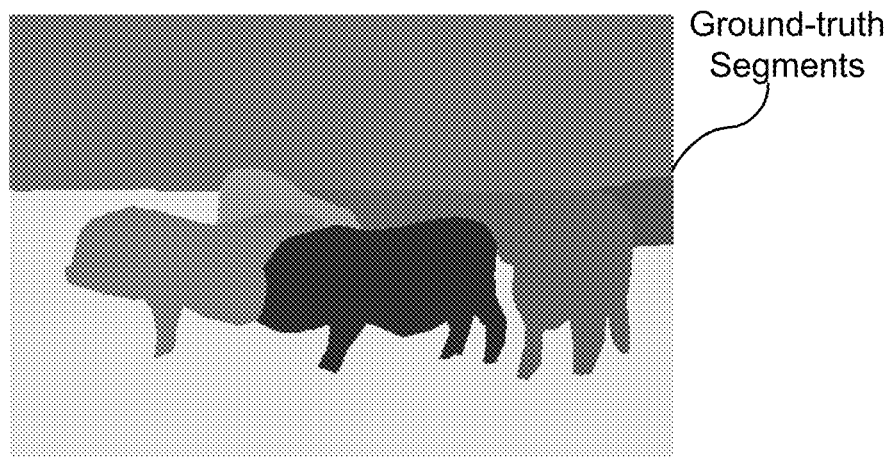
Figure 1B:
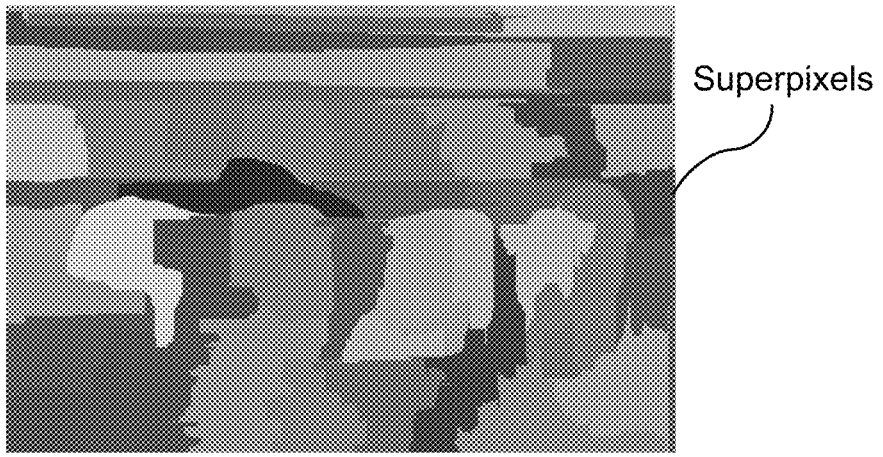

FIG. 1B illustrates input data, ground-truth segments, and superpixels, in accordance with an embodiment. As shown in FIG. 1B, the input data is an image and the ground-truth segments identify each object in the image. The input data is over-segmented to separately identify superpixels within each of the different objects (segments), including three pigs and a background. The superpixel segmentation system 100 receives the input data and the ground-truth segments corresponding to the input data. The PAN model 115 generates predicted pixel affinity values for the input data and the superpixel segmentation module 120 generates the superpixels using the predicted pixel affinity values. Note that ground-truth superpixels are not provided to the superpixel segmentation system 100.

The different colors of the ground-truth segments and superpixels are for visualization purposes and are not necessarily related to the colors of pixels in the input data. In the context of the following description, each color of a segment or superpixel may be considered to correspond to an index of a segment or superpixel. The indices of the different segments and superpixels are interchangeable, as it is only necessary for each pixel within the same segment or superpixel to have the same index as other pixels within the segment or superpixel.

In an embodiment, the superpixel segmentation system 100 is a deep neural network. There are several challenges in training the superpixel segmentation system 100, or any deep neural network, for extracting superpixels. First, there is no ground-truth for superpixels. As shown in FIG. 1B, ground-truth training data is available for segmentation. Second, the indices of different superpixels are interchangeable, so there are multiple valid outputs. Third, existing superpixel algorithms are not differentiable, so backpropagation of loss gradients is not possible. To overcome these issues, the superpixel segmentation system 100 is trained to predict the pixel affinities using the PAN model 115 that is differentiable. The ground-truth segmentation data is used to generate ground-truth pixel affinities and the SEAL module 110 computes a loss function to reduce differences between the ground-truth pixel affinities and predicted pixel affinities, improving the accuracy of the predicted pixel affinities.

Pixel affinities measure the likelihood of two neighboring pixels belonging to the same object. With accurate pixel affinities that take object boundaries into account, graph-based algorithms can extract semantically more meaningful superpixels. The predicted pixel affinities are used by the superpixel segmentation module 120 to perform graph-based superpixel segmentation. Graph-based algorithms consider an image as a planar graph, where pixels are vertices and pixel affinities are computed for connected pixels. The graph-based algorithms compute superpixels by partitioning the graph. Some algorithms cut or maintain the connections between the pixels, based on the pixel affinities, to generate regions of connected pixels corresponding to a superpixel.

Figure 1C:
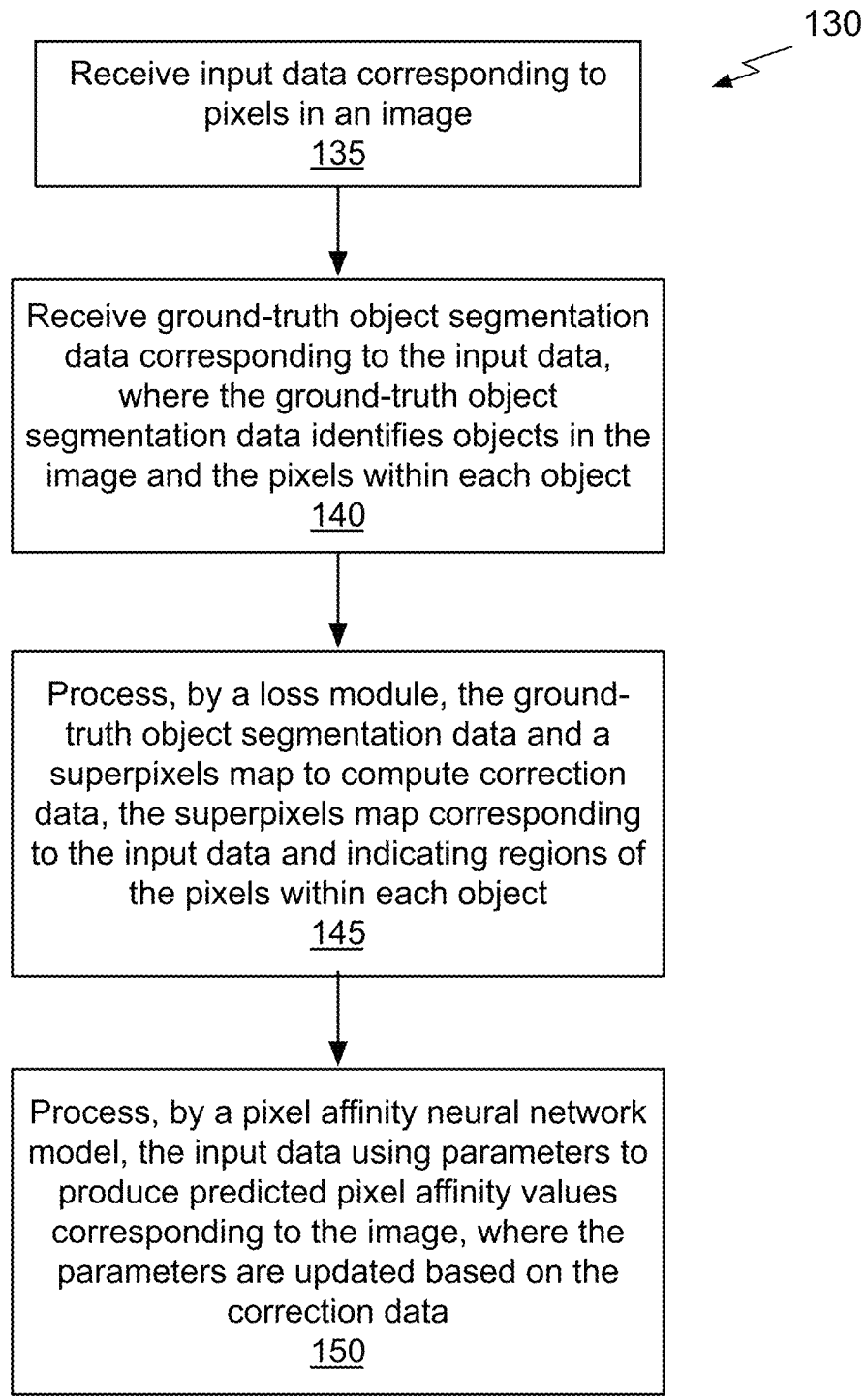
FIG. 1C illustrates a flowchart of a method for training the superpixel segmentation system, in accordance with an embodiment.

FIG. 1C illustrates a flowchart of a method 130 for training the superpixel segmentation system, in accordance with an embodiment. Although method 130 is described in the context of a processing unit, the method 130 may also be performed by a program, custom circuitry, or by a combination of custom circuitry and a program. For example, the method 130 may be executed by a GPU (graphics processing unit), CPU (central processing unit), or any processor capable of implementing a neural network model. Furthermore, persons of ordinary skill in the art will understand that any system that performs method 130 is within the scope and spirit of embodiments of the present invention.

At step 135, input data corresponding to pixels in an image is received at the PAN model 115. In an embodiment, the input data is color data represented as red, green, and blue (RGB) color components, YUV components, or the like. In an embodiment, the input data is infrared data.

At step 140, ground-truth object segmentation data corresponding to the input data is received at the SEAL module 110. The ground-truth object segmentation data identifies objects in the image and the pixels within each object.

At step 145, the SEAL module 110 processes the ground-truth object segmentation data and a superpixel map to compute correction data. The superpixel map corresponds to the input data and indicates regions of the pixels within each object. In an embodiment, the superpixel map is generated by the superpixel segmentation module 120 based on predicted pixel affinity values. In an embodiment, the predicted pixel affinity values are processed by the superpixel segmentation module 120 using a graph-based algorithm to produce the superpixel map. In an embodiment, the SEAL module 110 computes a loss function to generate the correction data. In an embodiment, the loss function is a weighted binary cross-entropy (BCE) loss. In an embodiment, the ground-truth object segmentation data is converted into ground-truth pixel affinity values to compute the correction data. In an embodiment, the correction data is associated with boundaries between the objects and within a pixel region.

At step 150, the PAN model 115 processes the input data using parameters to produce predicted pixel affinity values corresponding to the image, where the parameters are updated based on the correction data. In an embodiment the ground-truth segments are used as supervisory signals and the correction data adjusts the parameters to ensure the predicted pixel affinity values are low at segmentation boundaries and high elsewhere. In an embodiment, the correction data comprises gradients for updating each parameter. In an embodiment, the correction data comprises delta values that may be summed with the parameters.

In an embodiment, the SEAL module 110 computes a loss at every pixel of the input data based on the computed superpixels and ground-truth segments. The loss at each pixel is then back-propagated through the PAN model 115 to adjust the parameters. In an embodiment, the superpixel segmentation module 120 non-differentiable and backpropagating of the correction data through the superpixel segmentation module 120 is avoided.

As previously explained, learning superpixels with deep neural networks is not straightforward due to the following issues. First, there is no ground-truth for superpixel segmentation. As superpixels are over-segmentation of an image, the superpixel boundaries can be arbitrary as long as a superpixel is within an object. Second, the superpixel indices are interchangeable. The indices may be shuffled while keeping the superpixel representation intact, so there are several valid superpixel maps for a particular image. Third, most superpixel algorithms are not differentiable as the algorithms often involve discrete operations of clustering or subset selection.

A naive way to address the issues is to use deep features from pre-trained neural networks and plug them into existing superpixel algorithms. Since pre-trained deep network features were shown to generalize to different vision tasks, one may expect that these features would lead to performance gain in superpixel segmentation. In an embodiment, hand-crafted features are replaced with the deep features extracted from the pre-trained VGG16 (Visual Geometry Group) model. However, the extracted superpixels often fail to align with object boundaries. While the deep features provide discriminative information for high-level vision tasks, the deep features are invariant to some spatial information which is of great importance for localizing object boundaries. Thus, poor performance when the deep features are used for superpixel segmentation can be attributed to the fact that image segmentation is not explicitly considered in the training objectives. Similarly, for classification networks, the objective is to correctly classify images in terms of feature representations that are invariant to local edge information. Therefore, classification networks are also unsuitable for superpixel segmentation.

As edge detection is closely related to image segmentation, one may consider utilizing edge information to guide the graph-based superpixel algorithms. By letting pixels with high edge probability have low pixel affinities and pixels with low edge probability have high affinities, the graph-based algorithms should be able to keep object boundaries from merging when computing superpixels. While performance can be significantly improved using edge detection, a few missing boundary pixels in a near-perfect boundary map leads to merging of foreground and background regions and introduces segmentation errors. Deep edge detectors, on the other hand, are trained with the objective of maximizing boundary accuracy. As a result, a few missing boundary pixels only contributes to a small increase in edge detection loss. However, the few missing boundary pixels can cause a large segmentation error when used as pixel affinity values for superpixel segmentation. In contrast with edge detection or deep feature based solutions, the superpixel segmentation system 100 provides a segmentation-aware pixel affinity learning approach for graph-based superpixel segmentation.

In an embodiment, existing segmentation datasets including image data and ground-truth segmentation data are leveraged as supervisory signals to train the PAN model 115 for pixel affinity value prediction. Note that the ground-truth segmentation map (e.g., ground-truth segments shown in FIG. 1B) is for object segmentation rather than for superpixel segmentation. However, as superpixels are over-segmentation of an image, the object segmentation ground-truth may be used by the SEAL module 110 to define a loss function for pixel affinity value prediction. In an embodiment, to use the segmentation datasets, the ground-truth segmentation maps are first converted into pixel affinity values with zeros for the boundary pixels and ones for the remaining pixels. In an embodiment, horizontal label transitions in the ground-truth segmentation maps may be used to generate horizontal affinities and vertical transitions may be used to generate vertical affinities. For instance, if there is a ground-truth label transition (e.g., pig to background) from pixel (x,y) to pixel (x+1, y) then only the horizontal affinity at (x,y) is set as zero, but the vertical affinity is not set as zero.

Figure 2A:
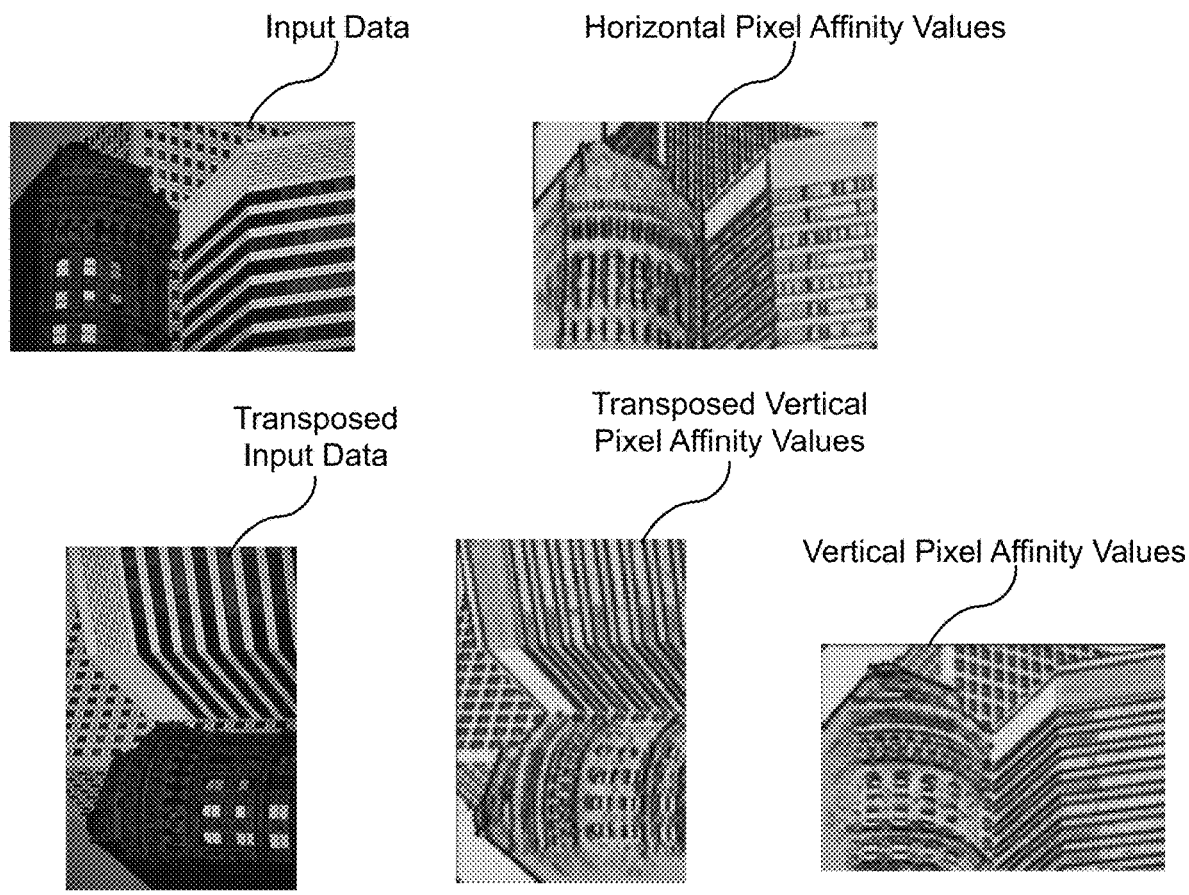
FIG. 2A is a conceptual diagram of predicted pixel affinity values, in accordance with an embodiment.

FIG. 2A is a conceptual diagram of predicted pixel affinity values, in accordance with an embodiment. In an embodiment, the PAN model 115 is designed to predict 4-connected pixel affinities (two in each of the vertical and horizontal directions). In an embodiment, the input data to the PAN model 115 is a color image and the output is a two-channel pixel affinity map with a first channel representing horizontal pixel affinity values and a second channel representing vertical pixel affinity values.

In an embodiment, for each pixel, PAN model 115 predicts affinities towards right and bottom pixels. For instance, the horizontal affinity at pixel (x,y) indicates the affinity value between pixel (x,y) and {x+1, y) and the vertical affinity at pixel (x,y) is the affinity value between pixel (x,y) and (x, y+1). In an embodiment, the last column of horizontal affinity and the last row of vertical affinity are discarded during testing and gradients with respect to the last column and last row, respectively, are set to zero during training.

In an embodiment, local affinity for each pixel is computed independently of the orientation of an input image. Therefore, both the horizontal and vertical pixel affinity values can be computed using the same neural network by rotating the input data from aligning along a horizontal axis to align along a vertical axis. In an embodiment, the input data are rotated from a horizontal alignment to a vertical alignment and the rotated input data is processed by the PAN model 115 in the horizontal direction to produce rotated vertical pixel affinity values. The rotated vertical pixel affinity values are then rotated to produce vertical pixel affinity values.

In an embodiment, the PAN model 115 is trained to predict horizontal pixel affinity values only and the vertical pixel affinity values are computed by processing the rotated input image (transposed input data). In other words, "one-way prediction" is used to generate the predicted affinity values in either the horizontal or vertical direction and predicted affinity values in the opposing direction (vertical or horizontal, respectively) are generated by rotating the input data.

In an embodiment, the PAN model 115 generates transposed vertical pixel affinity values for the rotated input image. The transposed vertical pixel affinity values may be transposed in reverse to produce the vertical pixel affinity values. The predicted horizontal and vertical pixel affinity values correspond to edge weights on an image graph.

In an embodiment, the PAN model 115 is configured to generate pixel affinity values in a single direction at a time (one-way prediction), processing the input data and the rotated input data in sequence to generate horizontal and vertical predicted pixel affinity values in sequence. In an embodiment, the PAN model 115 is configured to generate pixel affinity values in parallel, processing the input data and the rotated input data in parallel to generate horizontal and vertical predicted pixel affinity values in parallel.

Figure 2B:
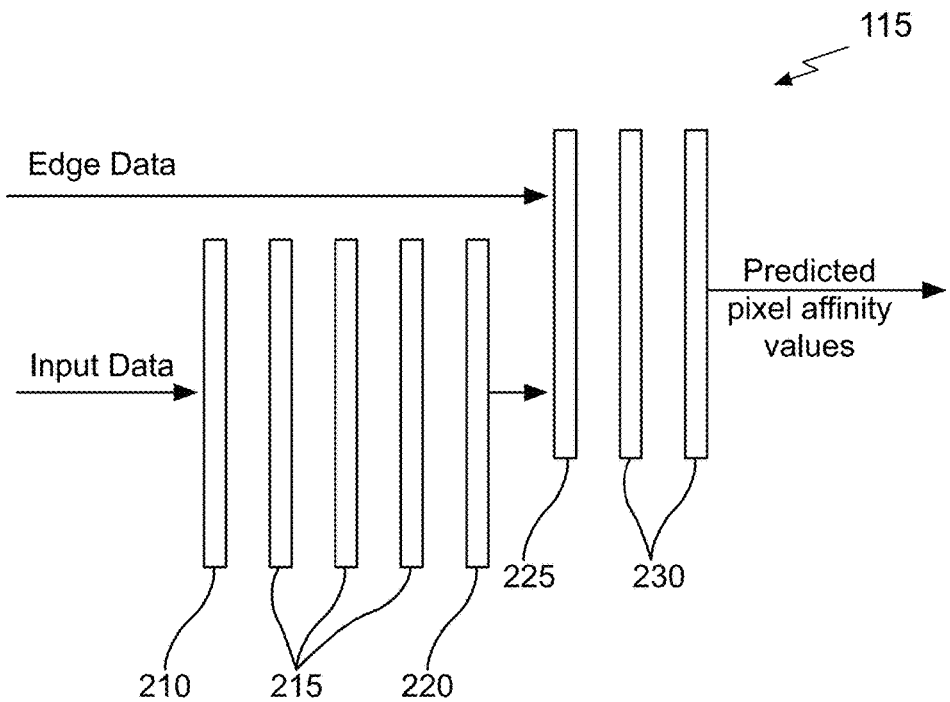
FIG. 2B illustrates a block diagram of the PAN model of FIG. 1A, in accordance with an embodiment.

FIG. 2B illustrates a block diagram of the PAN model 115 of FIG. 1A, in accordance with an embodiment. The PAN model 115, as shown in FIG. 2B, uses one-dimensional convolution kernels in a first layer 210 to capture changes in the image in one dimension (e.g., horizontal). In an embodiment, the layer 210 comprises 1×7 horizontal convolution kernels. The layer 210 is followed by 3 standard residual blocks (ResBlock) 215 of 128 channels. A single 1×1 convolution layer 220 is then used to convert 128 channels into 1-channel intermediate affinity predictions. In an embodiment, the input data is processed to generate edge data to help localize boundaries. The intermediate affinity predictions are concatenated with the edge data at a fusing layer 225 to form fused affinity predictions. The fused affinity predictions are passed to two 1×1 convolution layers 230 for final affinity prediction. In an embodiment, the edge data are Canny edges generated using a conventional technique. In an embodiment, sigmoid activations are used at the layer 220 and layers 230 to constrain the affinity values between 0 and 1. In an embodiment, the convolutional layer 210 is interleaved with a rectified linear unit (ReLU) function.

Figure 2C:
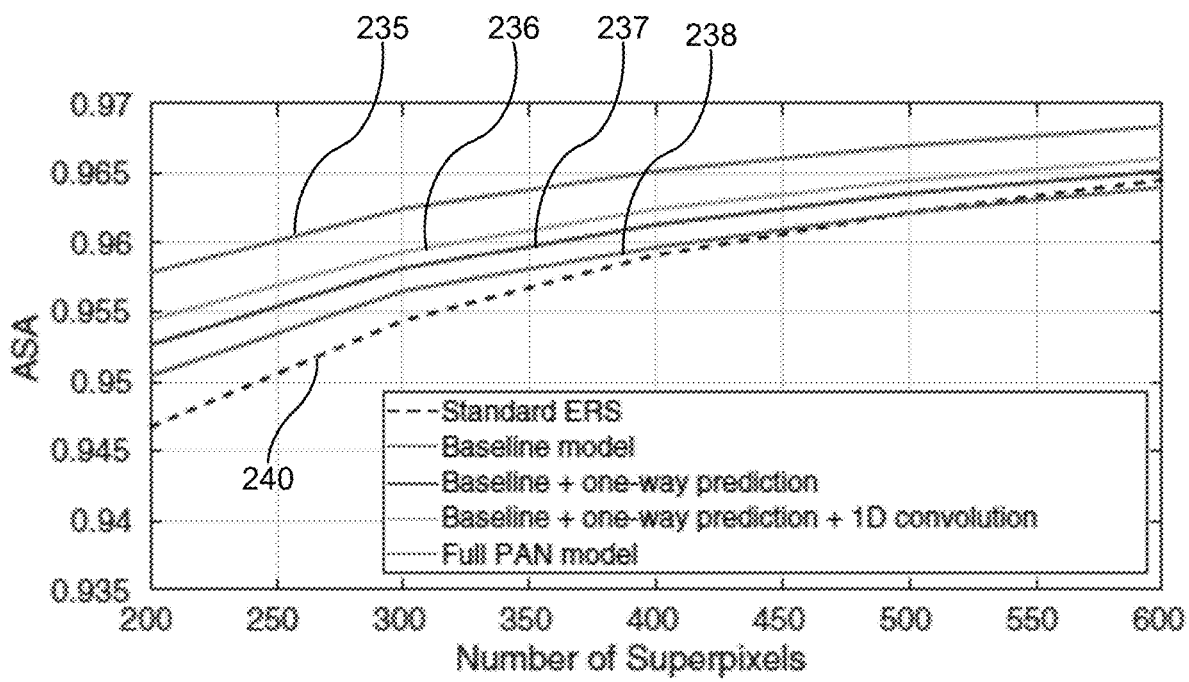
FIG. 2C illustrates accuracy comparisons for different variations of the PAN model, in accordance with an embodiment.

The PAN model 115, as shown in FIG. 2B is an embodiment and other embodiments may vary one or more of the layers. For comparison, FIG. 2C illustrates accuracy comparisons for different variations of the PAN model 115, in accordance with an embodiment. A baseline variation of the PAN model 115 is configured to predict both horizontal and vertical affinities separately, uses 7×7 filters for the layer 210, and omits the edge data and the fusing layer 225. The achievable segmentation accuracy (ASA) for different superpixel counts generated by the baseline variation of the PAN model 115 are shown as results 238. Results 237 is the baseline variation of the PAN model 115 configured to also use one-way prediction. Results 236 is the baseline variation of the PAN model 115 configured to also use one-way prediction and one-dimensional convolution for the layer 210. Results 235 is the variation of the PAN model 115 shown in FIG. 2B that is configured to use one-way prediction, one-dimensional convolution for the layer 210, and canny edges for the edge data. Results 240 are for conventional entropy rate superpixel (ERS) segmentation. ERS segmentation is a graph-based algorithm that merges disjoint sets of pixels by maximizing an entropy rate of pixel affinities to extract superpixels. Overall, the PAN model 115 performs robustly with respect to different design choices (e.g., one-dimensional convolution, edge data, one-way prediction, etc.) and compared with the conventional ERS segmentation.

The predicted affinities generated by the PAN model 115 are passed to the superpixel segmentation module 120 that implements a graph-based superpixel algorithm. Based on the computed superpixels and the ground-truth object segmentation map, the SEAL function is computed by the SEAL module 110 and the corrections (errors) are back-propagated to train the PAN model 115.

Figure 2D:
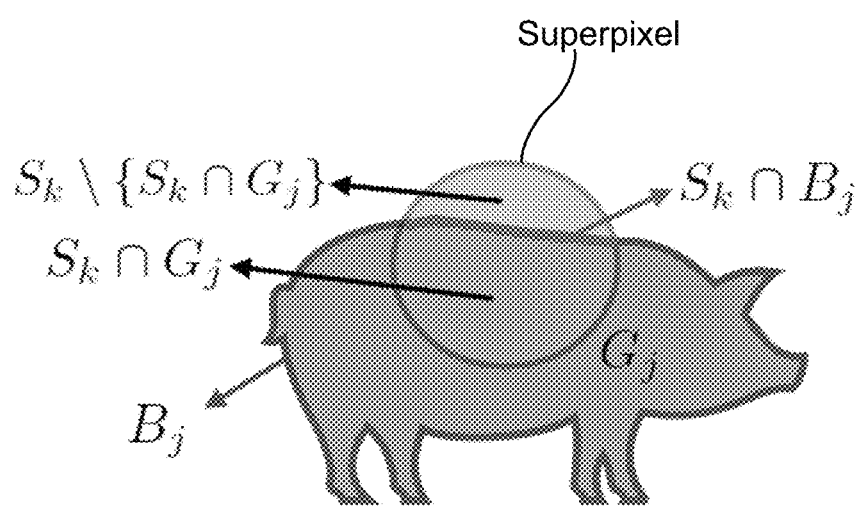
FIG. 2D is a conceptual diagram of segmentation error, in accordance with an embodiment.

FIG. 2D is a conceptual diagram of segmentation error, in accordance with an embodiment. The segmentation error for a superpixel (circle) $S_k$ is illustrated in FIG. 2D, where $G_j$ is a ground-truth object segment, having an object boundary $B_j$, that overlaps the most with $S_k$. The segmentation error corresponds to a leakage portion of the superpixel that lies outside of the ground-truth object segment. A superpixel must belong to a single object and the over-segmentation error (leakage) $\omega_{Sk}$ is given by the number of pixels in $S_k$ but not in $G_j$:

$$\omega_{Sk}=|S_k\backslash\{S_k\cap G_j\}|=|S_k|-|S_k\cap G_j|. \quad (1)$$

If the predicted affinities perfectly correlate with object boundaries, $\omega_{Sk}$ should be zero. When $\omega_{Sk}$ is not zero, some predicted affinities are incorrect. A SEAL function may be configured to penalize pixel affinity predictions according to the over-segmentation errors, as described further herein.

Given the binary ground-truth pixel affinity values (computed from the ground-truth segmentation maps) and the predicted pixel affinity values in both the horizontal and vertical directions, the affinity learning task may be formulated as a supervised learning problem using the binary cross-entropy (BCE) loss L:

$$L(\theta)=-\Sigma_i(t_i \log a_i+(1-t_i)\log(1-a_i)), \quad (2)$$

where $a_i \in (0,1)$ denotes predicted affinity at pixel i and $t_i \in \{0,1\}$ denotes the corresponding target affinity computed from ground-truth segmentation maps. In addition, θ denotes the parameters of the PAN model 115.

In an embodiment, the SEAL function is based on the BCE loss and penalizes pixel affinity predictions according to the over-segmentation errors. Specifically, assuming $B_j$ denotes the set of ground-truth boundary pixels; the pixels that are both in the ground-truth boundaries and in $S_k$ are given by $S_k \cap B_j$, as shown in FIG. 2D. The SEAL function is defined as a weighted BCE loss:

$$L_{SEAL}(\theta)=-\Sigma_i(1+\gamma_i)(t_i \log a_i+(1-t_i)\log(1-a_i)), \quad (3)$$

where $\gamma_i=\omega_{Sk}$ if $i \in S_k \cap B_j$ for some superpixel $S_k$ and the corresponding ground-truth segment $G_j$, otherwise $\gamma_i=0$. In other words, in an embodiment, if the pixels are on the ground-truth boundaries, the BCE loss is weighted with the over-segmentation error $(1+\gamma_i)$; otherwise, the BCE loss is used.

$$\gamma_i \begin{cases} \omega_{Sk}, & \text{if } i \in \{S_k \cap B_j\} \\ 0, & \text{if } i \notin B_j \end{cases}$$

The SEAL function improves the BCE loss by tying the loss calculation to superpixel segmentation errors. The predicted affinities are used to compute superpixels and the resulting superpixels are compared with the ground-truth segmentation map to measure the segmentation errors at each superpixel.

The SEAL function ensures that a larger over-segmentation error will lead to a larger loss value, which in turn will induce stronger gradients during training with the back-propagation algorithm. Note, when used for edge detection training, the BCE loss may suffer from imbalance of edge and non-edge samples. To overcome the data imbalance for edge detection, extra weights are introduced in the class-balancing BCE loss to balance two classes when training edge detectors. However, the class-balancing BCE loss does not take segmentation into account. Based on testing, pixel affinities trained using a class-balancing BCE loss do not generate satisfactory superpixels as the class-balancing BCE loss is agnostic to segmentation errors. In sum, because only the ground-truth boundary pixels are weighted for the SEAL function, any data imbalance issue is implicitly handled.

Figure 2E:
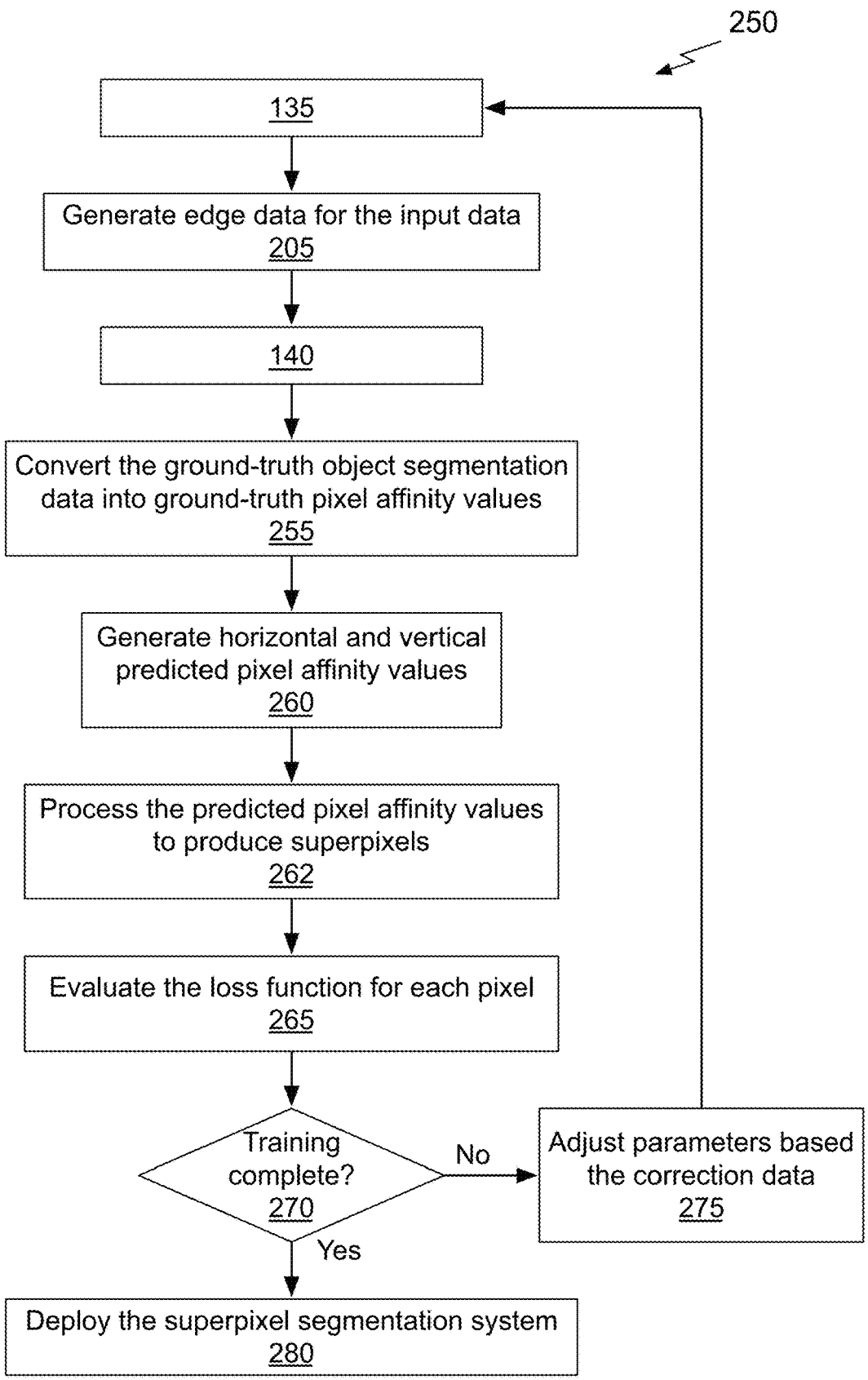
FIG. 2E illustrates a flowchart of another method for training the superpixel segmentation system, in accordance with an embodiment.

FIG. 2E illustrates a flowchart of another method 250 for training the superpixel segmentation system 100, in accordance with an embodiment. Although method 250 is described in the context of a processing unit, the method 250 may also be performed by a program, custom circuitry, or by a combination of custom circuitry and a program. For example, the method 250 may be executed by a GPU (graphics processing unit), CPU (central processing unit), or any processor capable of implementing the superpixel segmentation system 100. Furthermore, persons of ordinary skill in the art will understand that any system that performs method 250 is within the scope and spirit of embodiments of the present invention.

At step 135, input data corresponding to pixels in an image is received at the pixel affinity neural network model 115. At step 205, edge data is generated for the input data. In an embodiment, the PAN model 115 is configured to generate the edge data. At step 140, ground-truth object segmentation data corresponding to the input data is received at the SEAL module 110. At step 255, the ground-truth object segmentation data is converted into ground-truth pixel affinity values by the SEAL module 110. In an embodiment, the ground-truth pixel affinity values comprise horizontal and vertical pixel affinity values.

At step 260, the PAN model 115 generates horizontal and vertical predicted pixel affinity values. At step 262 the superpixel segmentation module 120 processes the predicted pixel affinity values to produce the superpixels. At step 265, the SEAL module 110 evaluates the loss function for each pixel to compute correction data. In an embodiment, the SEAL module 110 computes the SEAL loss function to generate the correction data.

At step 270, the SEAL module 110 determines if training is complete, and, if so, at step 280, the superpixel segmentation system 100 may be deployed. In an embodiment, training may be complete when the segmentation errors are below a threshold value for each pixel or a combination of the pixels. Otherwise, if training is not complete, at step 275, the PAN model 115 parameters are updated based on the correction data before returning to step 135. In an embodiment the loss at each pixel is backpropagated through the PAN model 115 to adjust the parameters at each layer.

The deep learning based approach to learn pixel affinities for superpixel segmentation uses a segmentation-aware loss function updating the parameters of the PAN model 115 based on segmentation errors. With the learned pixel affinities, the superpixels computed by the superpixel segmentation system 100 preserve object boundaries better than conventional neural network techniques relying on hand-crafted features. Experiments show the superpixel segmentation system 100 performs favorably compared with conventional techniques for superpixel segmentation. Improvements in superpixel accuracy, provided by the superpixel segmentation system 100, also translate to performance improvements in vision tasks that rely on superpixels, such as semantic segmentation and salient object detection.

Parallel Processing Architecture

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (i.e., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (i.e., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (i.e., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. The results can be transmitted to another PPU 304 or CPU via the NVLink 310. In an embodiment, the PPU 300 includes a number U of partition units 380 that is equal to the number of separate and distinct memory devices 304 coupled to the PPU 300. A partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (i.e., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
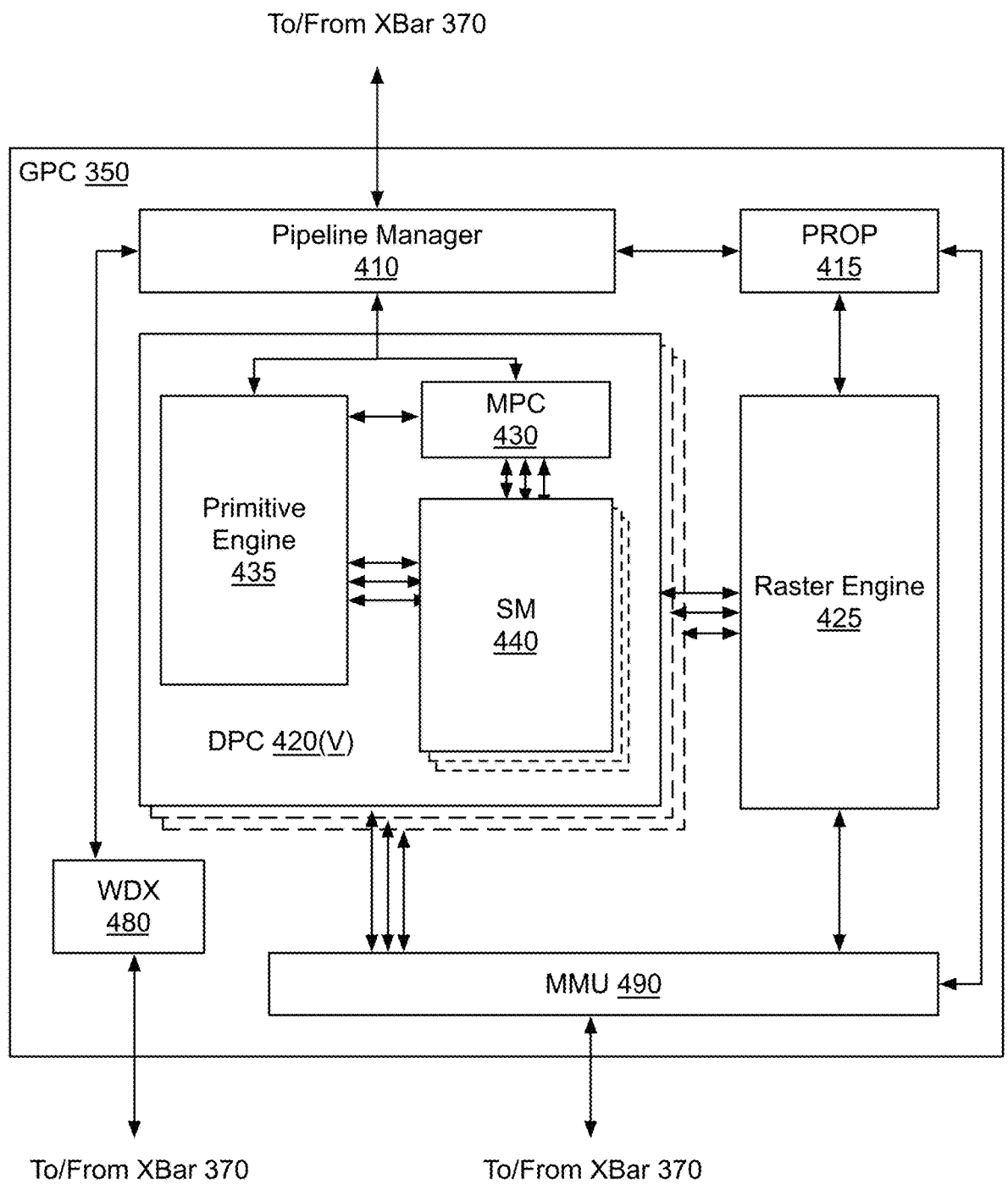
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
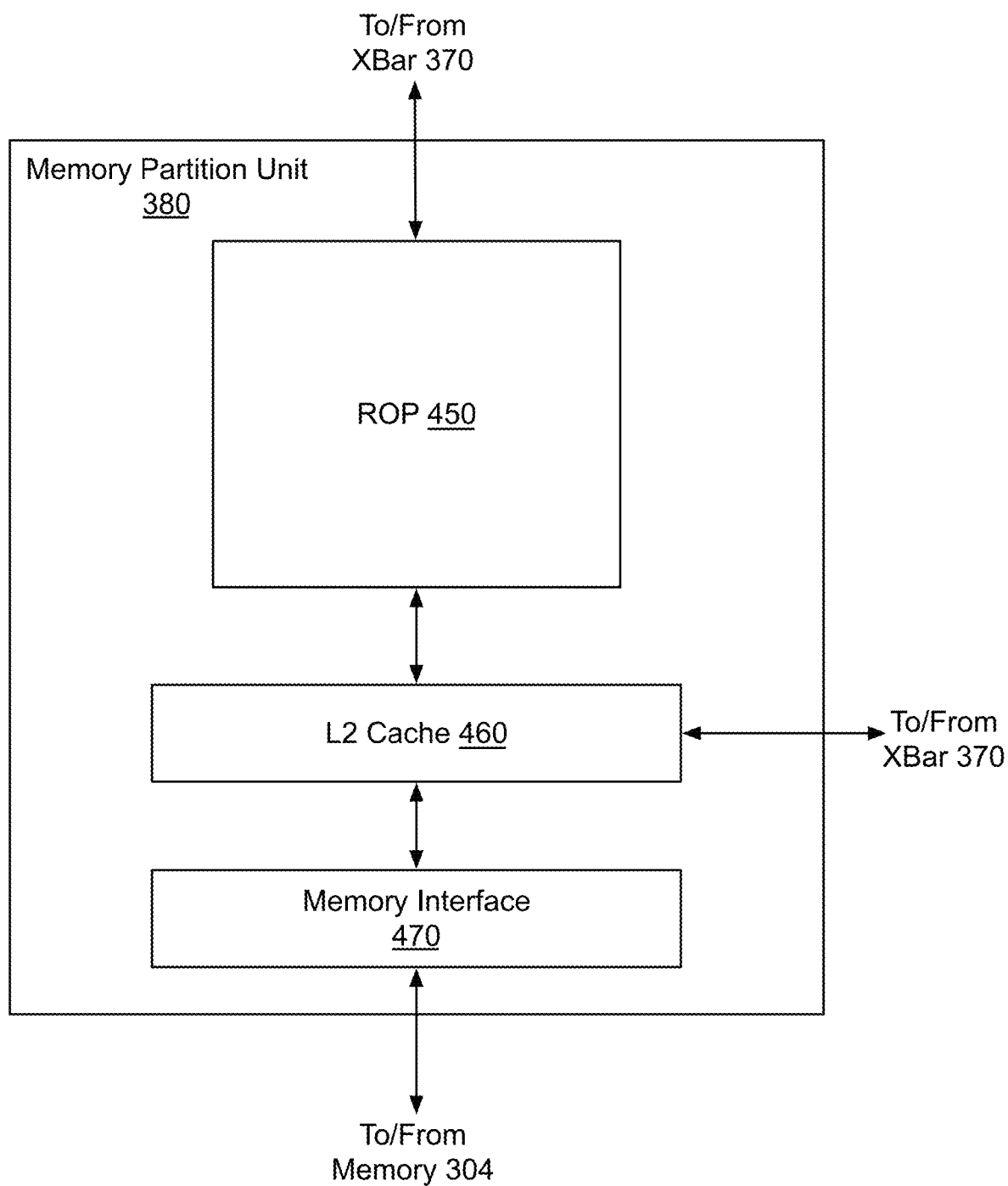
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of partition units 380, where each pair of partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
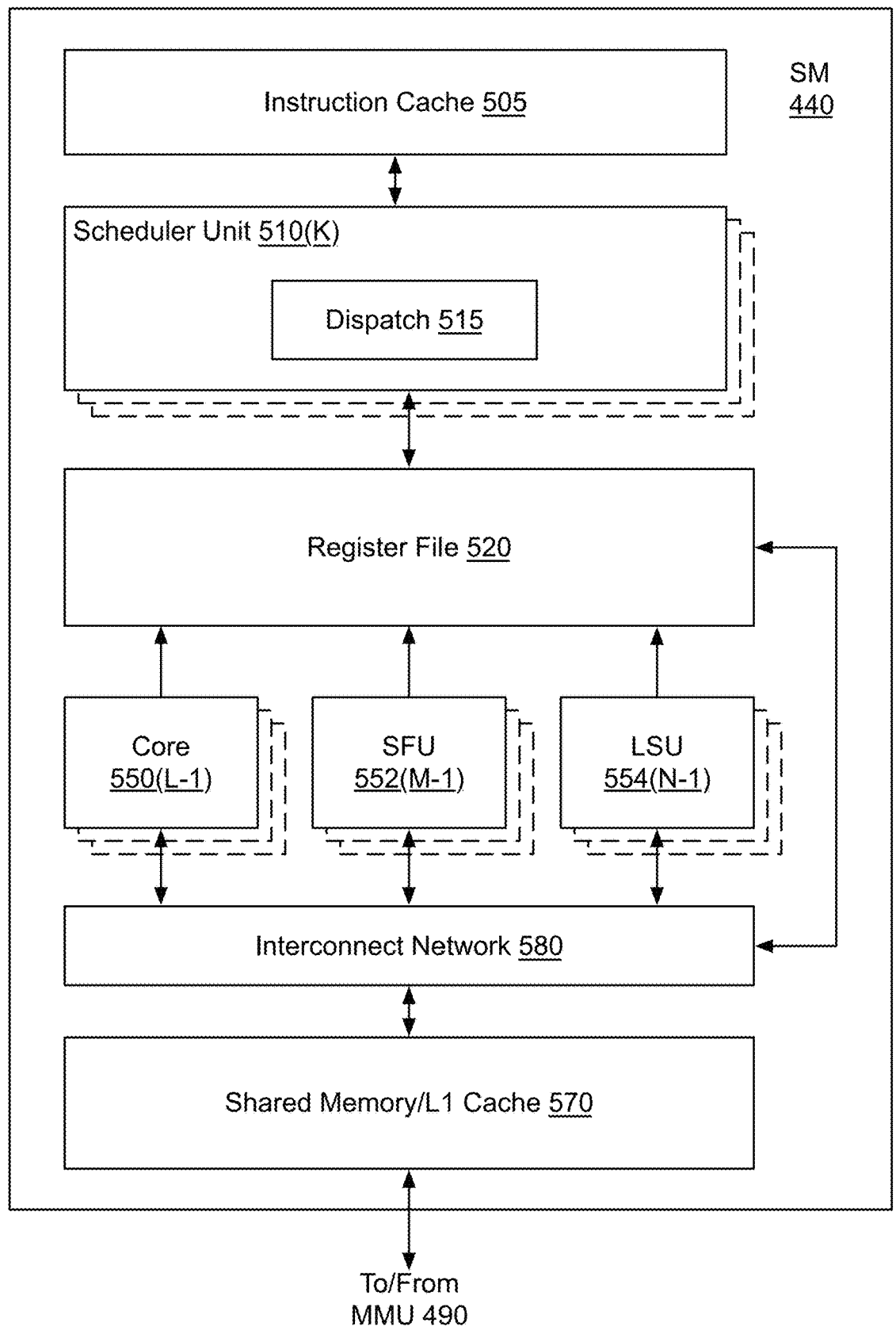
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (i.e., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation $D=A \times B+C$, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (i.e., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
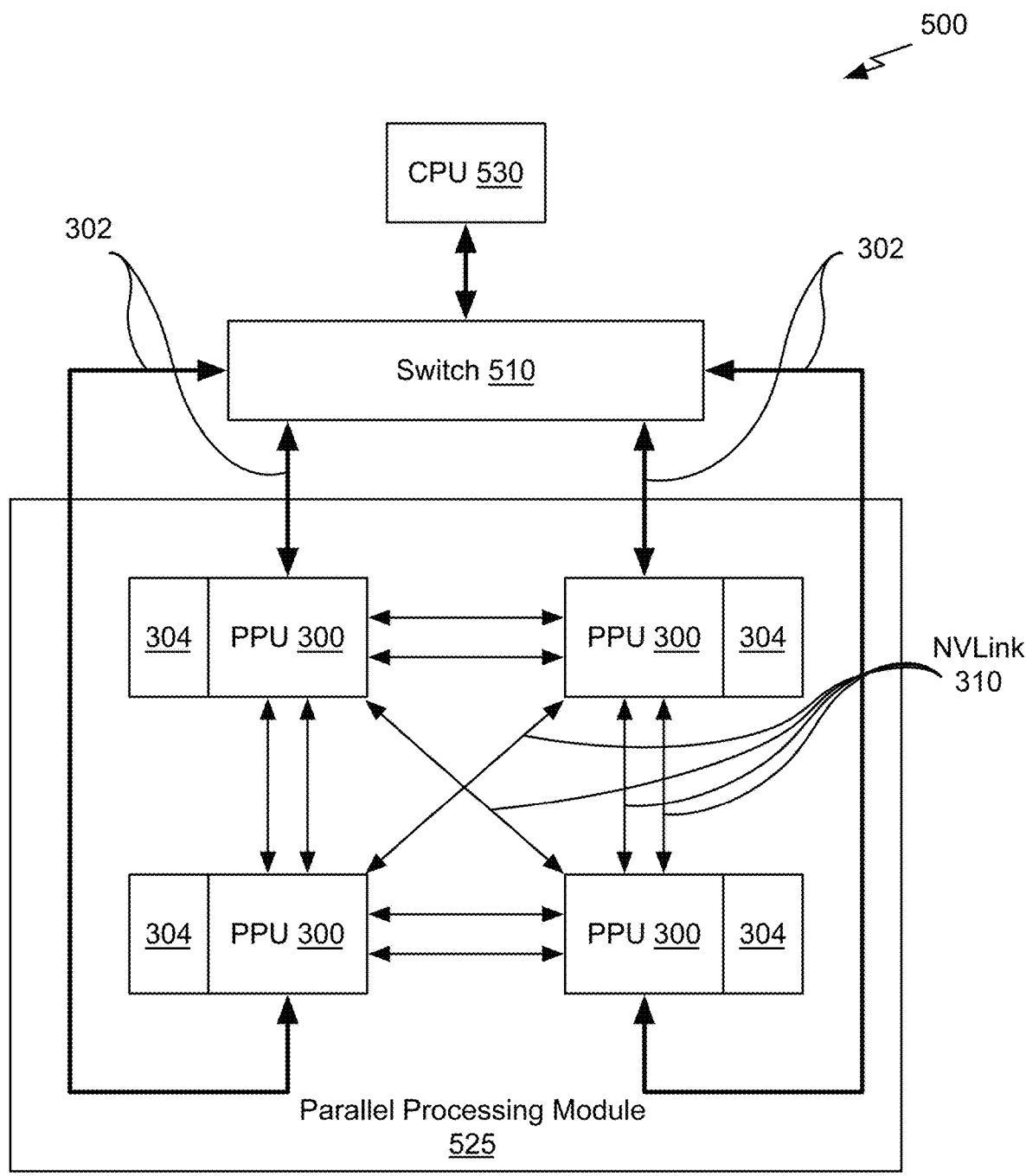
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the methods 130 and 250 shown in FIGS. 1C and 2E, respectively. The processing system 500 includes a CPU 530, switch 510, and multiple PPUs 300 each and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
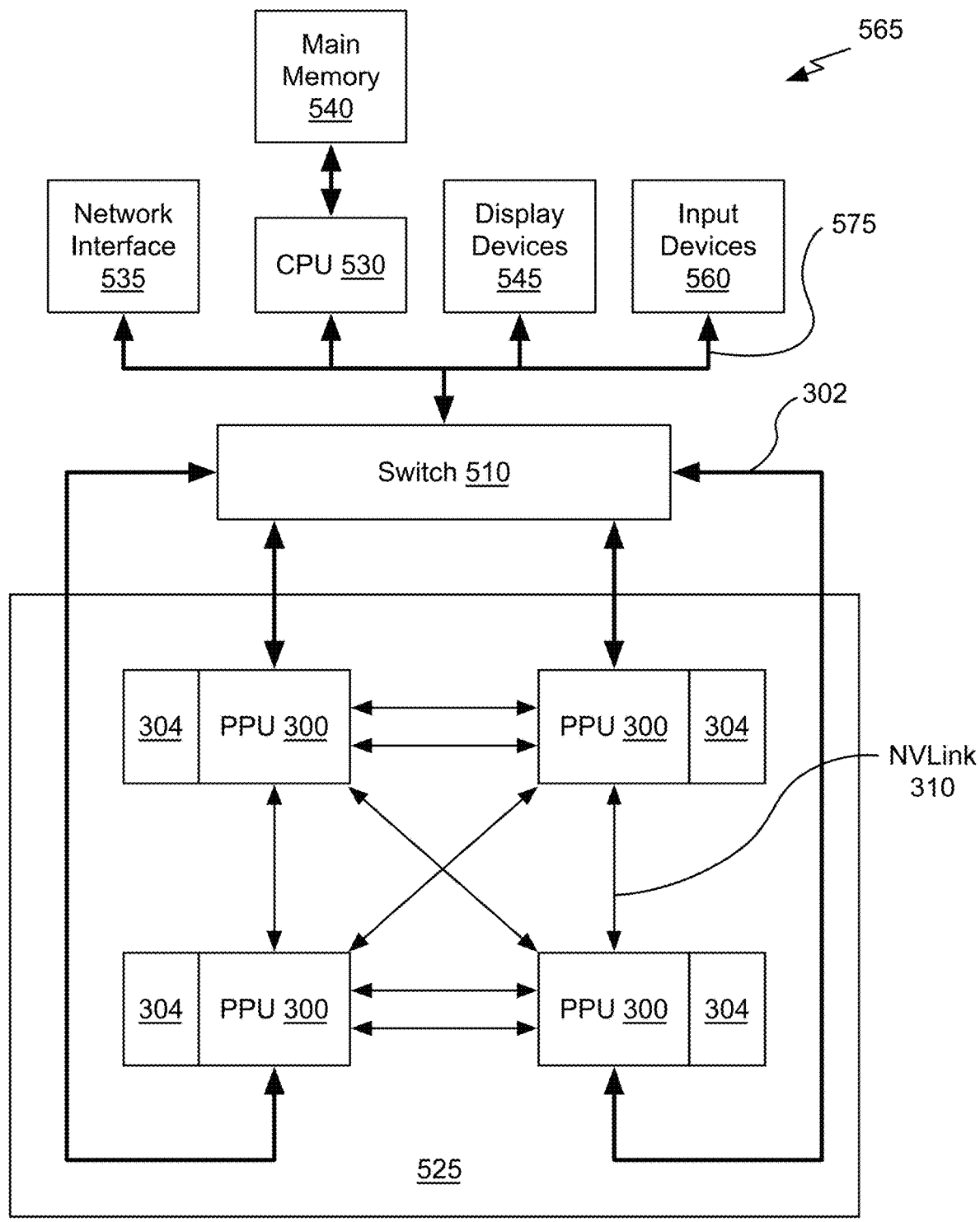
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the methods 130 and 250 shown in FIGS. 1C and 2E, respectively.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, i.e. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

What is claimed is:

1. A computer-implemented method, comprising:
    receiving input data corresponding to pixels in an image;
    receiving ground-truth object segmentation data corresponding to the input data, wherein the ground-truth object segmentation data identifies objects in the image and the pixels within each object;
    processing, by a loss module, the ground-truth object segmentation data and a superpixel map to compute correction data, the superpixel map corresponding to the input data and indicating regions of the pixels within each object; and
    processing, by a pixel affinity neural network model, the input data using parameters to produce predicted pixel affinity values corresponding to the image, wherein the parameters are updated based on the correction data.

2. The computer-implemented method of claim 1, wherein the predicted pixel affinity values are processed using a graph-based algorithm to produce the superpixel map.

3. The computer-implemented method of claim 1, wherein the predicted pixel affinity values define similarity of adjacent pixels.

4. The computer-implemented method of claim 1, converting the ground-truth object segmentation data into ground-truth pixel affinity values to compute the correction data.

5. The computer-implemented method of claim 4, wherein the computing the correction data comprises computing a binary cross-entropy loss based on the ground-truth pixel affinity values and the predicted pixel affinity values.

6. The computer-implemented method of claim 5, further comprising increasing a contribution to the binary cross-entropy loss for the pixels on the boundaries between the objects and within a pixel region.

7. The computer-implemented method of claim 1, wherein the predicted pixel affinity values comprise a first set of values for a horizontal direction and a second set of values for a vertical direction.

8. The computer-implemented method of claim 7, further comprising:
    rotating the input data;
    processing the rotated input data in the horizontal direction to produce rotated vertical pixel affinity values; and
    rotating the rotated vertical pixel affinity values to produce the second set of values.

9. The computer-implemented method of claim 1, wherein the correction data is associated with boundaries between the objects and within a pixel region.

10. The computer-implemented method of claim 1, further comprising processing the input data to produce edge data, wherein the pixel affinity neural network model combines the edge data with intermediate predicted pixel affinity values to produce the predicted pixel affinity values.

11. A system, comprising:
    a loss module configured to:
        receive input data corresponding to pixels in an image;
        receive ground-truth object segmentation data corresponding to the input data, wherein the ground-truth object segmentation data identifies objects in the image and the pixels within each object; and
        process the ground-truth object segmentation data and a superpixel map to compute correction data, the superpixel map corresponding to the input data and indicating regions of the pixels within each object; and
    a pixel affinity neural network model configured to process the input data using parameters to produce predicted pixel affinity values corresponding to the image, wherein the parameters are updated based on the correction data.

12. The system of claim 11, wherein the predicted pixel affinity values are processed using a graph-based algorithm to produce the superpixel map.

13. The system of claim 11, wherein the predicted pixel affinity values define similarity of adjacent pixels.

14. The system of claim 11, wherein the loss module is further configured to convert the ground-truth object segmentation data into ground-truth pixel affinity values to compute the correction data.

15. The system of claim 14, wherein the loss module is further configured to compute a binary cross-entropy loss based on the ground-truth pixel affinity values and the predicted pixel affinity values.

16. The system of claim 15, the loss module is further configured to increase a contribution to the binary cross-entropy loss for the pixels on the boundaries between the objects and within a pixel region.

17. The system of claim 11, wherein the predicted pixel affinity values comprise a first set of values for a horizontal direction and a second set of values for a vertical direction.

18. The system of claim 17, wherein the pixel affinity neural network model is further configured to:
   rotate the input data;
   process the rotated input data in the horizontal direction to produce rotated vertical pixel affinity values; and
   rotate the rotated vertical pixel affinity values to produce the second set of values.

19. The system of claim 11, wherein the correction data is associated with boundaries between the objects and within a pixel region.

20. A non-transitory, computer-readable storage medium storing instructions that, when executed by a processing unit, cause the processing unit to:
   receive input data corresponding to pixels in an image;
   receive ground-truth object segmentation data corresponding to the input data, wherein the ground-truth object segmentation data identifies objects in the image and the pixels within each object;
   process the ground-truth object segmentation data and a superpixel map to compute correction data, the superpixel map corresponding to the input data and indicating regions of the pixels within each object; and
   process the input data using parameters to produce predicted pixel affinity values corresponding to the image, wherein the parameters are updated based on the correction data.

* * * * *